United States Patent [19]

Lipets et al.

[11] 4,452,181

[45] Jun. 5, 1984

[54] DEVICE FOR HEATING AIR BY FLUE GASES IN STEAM BOILERS AND FURNACES

[76] Inventors: Adolf U. Lipets, prospekt Lenina, 150a, kv. 38; Mikhail I. Nekrasov, ulitsa Mashinostroitelei, 14, kv. 15, both of Podolsk, Moskovskaya oblast; Alexei Z. Fedosov, ulitsa Burakova, 7, korpus 2, kv. 18, Moscow; Vyacheslav P. Nikolaev, Krasnogvardeisky bulvar, 23, kv. 62, Podolsk, Moskovskaya oblasti; Viktor A. Golev, ulitsa Filippova, 10a, kv. 110; Nikolai M. Kurshin, ulitsa Mashinostroitelei, 24a, kv. 22; Ivan N. Rozov, ulitsa B. Zelenovskaya, 6, kv. 137; Ivan A. Sotnikov, ulitsa Mashinostroitelei, 32, kv. 114; Vladimir G. Ovchar, ulitsa Parkovaya, 49, kv. 43, all of, Podolsk, Moskovskaya oblast; Alexandr G. Popov, ulitsa Kaslinskaya, 97a, kv. 33; Anatoly A. Vasiliev, ulitsa Molodogvardeitsev, 48, kv. 142, both of Chelyabinsk; Alexei D. Postnikov, ulitsa Udarnikov, 10, kv. 56, Podolsk, Moskovskaya oblast; Vladimir I. Dombrovsky, ulitsa Kaslinskaya, 19a, kv. 32, Chelyabinsk; Vladimir K. Evstafiev, ulitsa Pravdy, 7/8, kv. 3, Podolsk, Moskovskaya oblast, all of U.S.S.R.

[21] Appl. No.: 432,368

[22] Filed: Sep. 30, 1982

[51] Int. Cl.³ ............................................. F22B 33/00
[52] U.S. Cl. .................................. 122/1 A; 110/216; 110/302; 122/DIG. 13; 122/20 B; 165/DIG. 2
[58] Field of Search ............ 122/DIG. 13, 1 A, 20 B, 122/44 A, 155 A; 110/216, 217, 302; 165/DIG. 2, 174

[56] References Cited

U.S. PATENT DOCUMENTS

| 1,802,930 | 4/1931 | Seelert | 165/174 X |
| 3,630,276 | 12/1971 | Paine et al. | 165/174 |
| 4,120,267 | 10/1978 | Wood | 122/20 B |
| 4,213,403 | 7/1980 | Gomori | 110/216 |

*Primary Examiner*—Edward G. Favors
*Attorney, Agent, or Firm*—Steinberg & Raskin

[57] ABSTRACT

A device for heating air by flue gases in steam boilers and furnaces, comprises a supply flue, sections mating therewith, and a device for protection of heat-exchange tubes against abrasive wear arranged in the flue. Each section comprises heat-exchange tubes attached to tube plates. The device for protection of the heat-exchange tubes against abrasive wear incorporates at least one screen formed by corrugated sheets facing each other and mating along the lines of contact of sheet convex portions, whereby cells are made up.

5 Claims, 7 Drawing Figures

DEVICE FOR HEATING AIR BY FLUE GASES IN STEAM BOILERS AND FURNACES

Field of the Invention

The present invention relates to heat-transfer engineering, and, more specifically, to devices for heating air by flue gases in steam boilers and furnaces.

BACKGROUND OF THE INVENTION

With an ever increasing shortage of mineral resources, low-grade high-ash fuel and raw materials with a high content of barren rock find expanding application in modern industry.

Where industrial furnaces and steam boilers operate on the foregoing types of raw materials and fuel, flue gases utilized at a later stage in air heating devices carry ash or other hard particles acting on heat-exchange tubes in said devices and bringing about heavy abrasive wear thereof.

The heat-exchange tubes undergo extensive wear because the flow of flue gases contracts at the inlet of the heat-exchange tubes and then expands with the results that the flow directed obliquely strikes the walls of the heat-exchange tubes in the air heating device. Since the flow of flue gases contains ash and other hard particles, the walls of heat-exchange tubes undergo heavy wear due to the action of said particles affecting the walls mostly in the area near the entry of flue gases into the heat-exchange tubes, that is, at a distance of two or three tube diameters from the inlet.

Wear of heat-exchange tubes greatly increases in modern high-power steam boilers and industrial furnaces wherein supply flues of large cross-sectional area incorporate bend portions inevitable under confined space conditions. The above-mentioned design of the supply flues does not permit constructing a sufficiently long vertical flue portion for sending the flue gas flow along the axes of the heat-exchange tubes, whereby the flue gas flow is not directed obliquely to the axes thereof and the rate of abrasive wear in the heat-exchange tubes is reduced. In oder to protect the heat-exchange tubes against abrasive wear, the supply flue of the air heating devices is commonly furnished with special-function devices.

Known in the art is a tubular air heater comprising heat-exchange tubes fastened to tube plates, and a supply flue (cf. USSR Inventor's Certificate No. 558133, F 23L15/04, published in 1974).

The prior-art air heater incorporates a device designed for protection of the heat-exchange tubes against abrasive wear, located in front of a tube plate on the side of the flue gas inlet with a certain clearance between the device and tube plate, and contrived in the form of a throttling perforated sheet wherein the axes of holes are aligned with those of the heat-exchange tubes.

When hot flue gases carrying hard particles or ash flow through the holes in the perforated sheet, the gas flow is divided into a number of jets that contract in the holes and expand at leaving them, with the result that the flow velocity decreases. The jets propagating at said velocity smoothly enter the heat-exchange tubes of the device all across the section thereof, and the rate of abrasive wear of the tubes decreases.

The above-mentioned air heater is applicable only where the vertical portion of the supply flue is long enough to direct the gas flow along the axes of the heat-exchange tubes. If flue gases are supplied through the supply flue wherein a bend section is installed, such air heater, is impracticable since the flue gas flow is directed at an acute angle to the surface of the perforated sheet. The perforated sheet per se cannot straighten the flue gas flow. Therefore the air heater heat-exchange tubes are exposed to heavy abrasive wear.

Besides, it should be noted that certain difficulties exist in manufacture and assembly of such air heater because the holes in the perforated sheet and heat-exchange tubes must be aligned to a high degree of accuracy.

There is also known a tubular air heater comprising heat-exchange tubes attached to tube plates, and a device installed in the supply flue for protection of tubes against abrasive wear and devised in the form of a perforated sheet carrying tubular insets fitted free into the holes thereof, with opposite ends of the insets introduced into the tube plate holes and fitted butt with the heat-exchange tubes (cf. USSR Inventor's Certificate No. 357419, F 23 L 15/04, published in 1972).

The foregoing prior-art air heater is applicable both when the flue gas flow is sent thereto through the vertical supply flue of when the gas flow is directed through the supply flue incorporating a bent portion. Since abrasive wear in the foregoing air heater is localized in the tubular insets, the heat-exchange tubes proper are protected against wear. It should however be noted that with the flue gas flow fed through the supply flue incorporating the bent portion, the tubular insets undergo particularly heavy wear because the gas flow velocity therein is equal to that inside the heat-exchange tubes. In this case the tubular insets must be replaced quite frequently consuming much labour because the number of heat-exchange tubes in such an air heater as that used in the boiler of 500-MW power unit amounts to about 200,000 pieces.

In addition, the manufacturing procedure of the air heater as a whole is rather labour-consuming since the tubular insets are sunk in the tube plate to permit butt jointing thereof with the heat-exchange tubes, and, hence, the assembly and welding of the air heater are considerably complicated.

There is likewise known in the art a device for heating air by flue gases in steam boilers and furnaces, comprising a supply flue, adjacent sections each consisting of heat-exchange tubes attached to tube plates, and a device for protection of the tubes against abrasive wear disposed inside the supply flue, which is the closest analogue to this invention (cf. the magazine TEPLO-ENERGETIKA (HEAT ENGINEERING) (in Russian), ENERGOIZDAT Publishers, Moscow, No. 12, 1981, pp 18 through 21).

The device for protection of tubes against abrasive wear used in the prior-art air heater comprises sheets located in the bend of the supply flue and intended to direct the flue gas flow to the heat-exchange tubes equipped with tubular insets attached to a tube plate.

The flue gas flow through the supply flue incorporating a bent turn portion is turned by the sheets through an angle of about 90 deg and is sent to the heat-exchange tubes along the axes thereof, with the result that the rate of abrasive wear of the heat-exchange tubes is reduced.

The tubular insets mounted on each heat-exchange tube protect the tubes against abrasive wear by localizing said wear directly in the insets. Since the flue gas flow velocity in the tubular insets is as high as that in the heat-exchange tubes because of equal cross-sectional areas, the insets proper are exposed to heavy abrasive wear.

It should be noted that centrifugal forces produced by the turn of the flue gas flow in the supply flue drive hard particles toward the guide sheets where they accumulate at guide sheet parts which are terminal with respect to the direction of gas flow. Concentration of hard particles in said areas leads to heavier wear of the tubular insets located directly beside the terminal parts of the guide sheets, and, hence, to a higher rate of wear of the device as a whole. To preclude accumulation of hard particles in the foregoing areas, they must be evenly distributed over the entire cross section of the supply flue, which is practicable only by installing a great number of guide sheets therein. Yet, such design of the device increases the metal requirements of construction, complicates the assembly procedure and renders the device irrepairable.

In addition, the tubular insets exposed to heavy wear require frequent replacement, and the costs of manufacture, removal and installation thereof are high.

Furthermore, to provide for dependable protection of the heat-exchange tubes against abrasive wear, the tubular insets installed on the tube plate must be accurately aligned axially with the heat-exchange tubes so that the gas flow should smoothly enter each heat-exchange tube.

Should the tubular insets be displaced from the heat-exchange tubes even by 0.5 to 1.0 mm, the efficiency of protection of the heat-exchange tubes against abrasive wear decreases abruptly.

SUMMARY OF THE INVENTION

The principal object of the invention is to provide dependable operation of a device for heating air.

Another object of the invention is to prevent heavy abrasive wear of heat-exchange tubes.

One more object of the invention is to simplify the manufacture, installation and repair of the proposed device.

With these and other objects in view, the invention resides in that in a device for heating air by flue gases in steam boilers and furnaces, comprising a supply flue, sections adjacent thereto, each made up of heat-exchange tubes attached to tube plates, and a device disposed in the supply flue and serving for protection of the heat-exchange tubes against abrasive wear, the device for protection of the heat-exchange tubes against abrasive wear, according to the invention, is contrived in the form of at least one screen comprising corrugated sheets facing each other and mating along the lines of contact of convex portions whereby cells are formed.

The foregoing construction of the device prevents heavy wear of the heat-exchange tubes by virtue of straightening the flue gas flow in the supply flue, and maintaining even distribution of ash and other hard particles over the entire cross-sectional area thereof.

The device for heating air by flue gases in steam boilers and furnaces, according to the invention, must be constructed so that the height of each cell in the screen is two to five times the maximum size of the cross section thereof.

The screen constructed as described above reduces abrasive wear of the heat-exchange tubes by minimizing the probability of deflection of the flue gas flow in relation to the direction of heat-exchange tube axes.

In the screen where the height of each cell is less than two maximum sizes of the cross section thereof, abrasive wear of the heat-exchange tubes rises more than threefold because some part of flue gases released from the cells is notably inclined to the axes of the heat-exchange tubes.

In the screen where each cell has a height exceeding-five maximum sizes of the cross section thereof, the efficiency of protection of the heat-exchange tubes against abrasive wear rises only insignificantly because the possible deflection angle of some part of flow from the heat-exchange tube axes is small. At the same time, the metal consumption and the dimensions of the whole device proposed herein will increase.

To provide for better protection of the heat-exchange tubes against abrasive wear, the screen disposed in the flue must join the tube plate, with the axis of each cell thereof aligned with the axis of the respective heat-exchange tube, and with the distance between the cell equal to those between the heat-exchange tubes.

In the device of the above-mentioned construction, the velocity of flue gases sent to the screen cells is much less than the velocity of same gases entering the heat-exchange tubes, and, hence, the screen serving to straighten the gas flow undergoes little abrasive wear. As for the heat-exchange tubes, the abrasive wear thereof will be precluded as the injection of the flue gas flow therein is stepped and nearly smooth.

Besides, minor displacement between the axes of the screen cells and heat-exchange tubes does not essentially affect the efficiency of protection thereof against abrasive wear.

The device of the present invention for heating air by flue gases fitted to a supply flue incorporating a bent portion permits installing two screens, with one screen compulsorily installed in the vertical portion of the flue for further improvement of protection of the tubes against abrasive wear. In this case one screen located in the vertical portion of the supply flue straightens the flue gas flow and directs it along the heat-exchange tube axes, and the other screen that can be arranged on the tube plate permits even inflow of flue gases into the heat-exchange tubes.

Each cell in the proposed device for heating air by flue gases may be hexagonal in cross section for distributing the inlet flue gases more evenly over the entire perimeter of each heat-exchange tube, whereby wear of the tubes is reduced.

In order to simplify the manufacture, assembly and repair of the device according to the invention, the screen comprises separate blocks, each consisting of 50 to 150 cells.

In the device of the above-mentioned design, the screen blocks can be mounted so that the heat-exchange tubes and screen cells are axially aligned to a higher degree of accuracy. If the number of cells in the block is less than fifty, the manufacture and assembly of the screen is more labour-consuming, and if that number is above one hundred and fifty, the tolerances for linear dimensions of the blocks increase, and, hence, the blocks cannot be assembled as accurately.

BRIEF DESCRIPTION OF THE DRAWINGS

The invention will now be described in greater detail with reference to a preferred embodiment thereof taken in conjunction with the accompanying drawings, wherein:

Referring to FIG. 1, the device for heating air by flue gases in stem boilers and furnaces comprises a supply flue 1 and adjacent sections 2 incorporating heat-exchange tubes 3 attached to tube plates 4. A device for protection of the heat-exchange tubes 3 against abrasive wear is arranged inside the supply flue 1 in the vertical part thereof. The protecting device incorporates at least one screen 5 formed by corrugated sheets 6 (FIG. 2) facing each other and mating along the lines of contact of convex portions, whereby cells 7 are composed. The corrugated sheets 6 can be manufactured from thin sheet metal, or from heat-resistant plastics.

The height of each cell 7 in the screen 5 is two to five times the maximum size of the cross section thereof.

Figure 3:
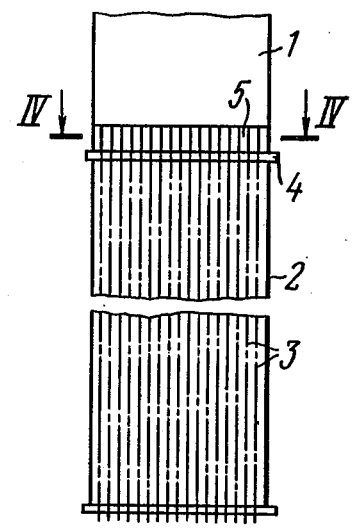
FIG. 3 is same as in FIG. 1, with the screen joining the tube plate, according to the invention.

Turning now to FIG. 3, the screen 5 arranged in the vertical portion of the supply flue 1 can be joined with the tube plate 4 of the section 2, wherewith the axis of each cell 7 (FIG. 4) in the screen 5 must be aligned with the axis of the respective heat-exchange tube 3, and the distances between the cells 7 must be equal to distances between the heat-exchange tubes 3. The screen 5 is attached to the tube plate 4 by some prior-art method, for example, by welding.

Figure 2:
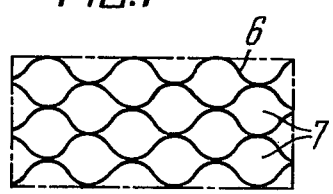
FIG. 2 is a plan view of a screen, according to the invention.
Figure 5:
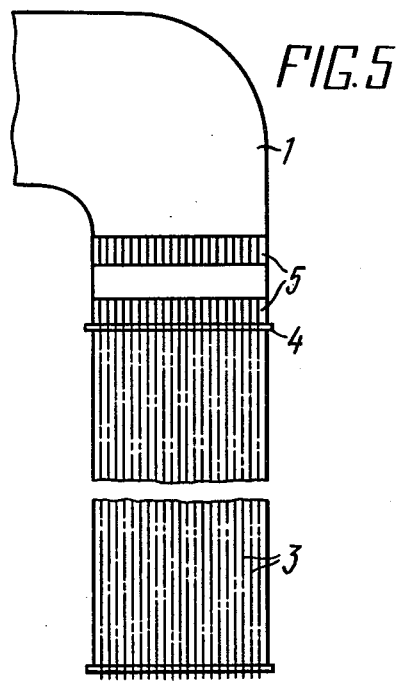
FIG. 5 is same as in FIG. 1, with two screens employed, according to the invention.

The device according to the present invention can incorporate two screens 5 (FIG. 5), with one of them invariably arranged in the vertical portion of the supply flue 1. Considering that the cells 7 (FIG. 2) of the screen 5 are of elongate shape, it is expedient that the screen 5 be installed in such a manner that the longer axes of cross sections in the cells 7 be normal to the direction of the flue gas flow through the horizontal portion of the supply flue 1.

In order that the flue gas flow is distributed more evenly at the inlet, each cell 7 of the screen 5 (FIG. 6) can be hexagonal in cross section. For simplicity of manufacture, assembly and repair, the screen 5 of the device according to the present invention can be formed of separate blocks 8 (FIG. 7), each comprising from 50 to 150 cells 7. The dimensions of the blocks 8 and the tolerances thereof are selected so as to set up a clearance 9 between them to permit installing the blocks 8 within tolerances and aligning the axes of the heat-exchange tubes 3 and cells 7.

The air heating device utilizing flue gases of steam boilers and furnaces operates as follows.

Figure 1:
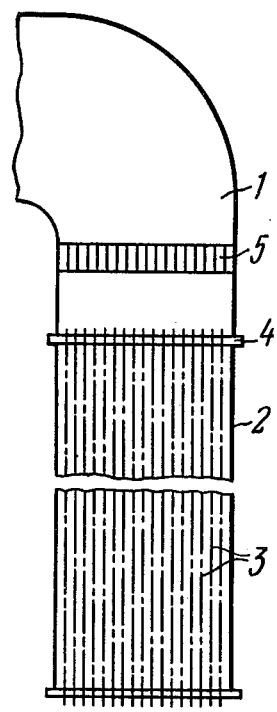
FIG. 1 schematically represents a general longitudinal sectional view of a device for heating air by flue gases in steam boilers and furnaces, according to the invention.

The flow of flue gases containing ash and other hard particles passes through the supply flue 1 (FIG. 1) that can incorporate both a vertical and a horizontal portions, and a bend interconnecting them, and enters the heat-exchange tubes 3 attached to the tube plates 4 of the sections 2.

Air to be heated is supplied to the intertubular space of the sections 2. Ash and other hard particles carried by flue gases cause heavy abrasive wear of the heat-exchange tubes 3 wherein the walls are acted upon by the particles. The rate of wear of the heat-exchange tubes 3 increases when the flue gas flow deflects from the direction of the axes of the heat-exchange tubes 3 in the area where the flow is turned inside the supply flue 1.

Figure 4:
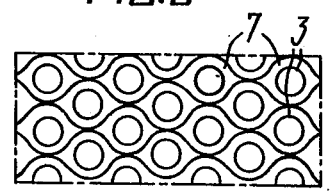
FIG. 4 is a sectional view taken along line IV—IV of FIG. 3, according to the invention.

For minimizing the rate of wear of the heat-exchange tubes 3, the flue gas flow is straightened upstream of the sections 2 by means of the device serving to protect the heat-exchange tubes 3 against abrasive wear and disposed in the vertical portion of the supply flue 1. The device is essentially the screen 5 (FIG. 1) comprising the corrugated sheets 6 (FIG. 2) facing each other and mating along the lines of contact of sheet convex portions, whereby the cells 7 are formed with the height thereof two to five times exceeding the maximum size of the cross section thereof. The flue gas flow passing through the cells 7 of the screen 5 is sent to the heat-exchange tubes 3 in the direction nearly identical to that of the axes thereof. With the above relation between the dimensions of the cells in the screen, the deflection of the flue gas flow from the specified direction is minimum. Thus, the flue gas flow entering the heat-exchange tubes 3 of the sections 2 is straightened, and this feature alone contributes to minimizing the rate of abrasive wear of the heat-exchange tubes 3. To achieve substantial reduction of abrasive wear of the heat-exchange tubes 3, the screen 5 disposed in the vertical portion of the supply flue 1 should directly join the tube plate 4 (FIG. 3), with the axes of the cells 7 set in line with the axes of the heat-exchange tubes 3, and with the distances between the cells 7 made equal to the distances between the heat exchange tubes 3 (FIG. 4). In this case the flue gas flow carried through the cells 7 of the screen 5 is separated into a number of jets, whereby each jet smoothly enters the respective heat-exchange tube 3 all over the cross section thereof without appreciable compression of the flow and, hence, without erosive action on the walls in the heat-exchange tubes 3.

Figure 6:
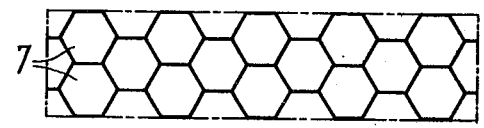
FIG. 6 shows an embodiment of the screen wherein cells are hexagonal in cross section, according to the invention.

The maximum efficiency is provided when two screens 5 (FIG. 5) are installed in the flue 1, with one screen compulsorily arranged inside the vertical portion thereof. One screen 5 can be mounted directly on the tube plate 4, and the other can be disposed at some distance above it. The first screen 5 in the way of flue gases installed in the vertical portion of the supply flue 1 takes up the major action of the gas flow, straightens it and directs it along the axes of the heat-exchange tubes 3. However, the screen 5 proper does not undergo heavy wear as it does not actually block the passage in the supply flue and, hence, the velocity of flue gases flowing therethrough is low. The other screen 5 disposed on the tube plate 4 breaks up the gas flow into separate shaped jets smoothly sent from each cell 7 of the screen 5 to the respective heat-exchange tube 3. In order that the flue gases entering into each heat-exchange tube be more evenly distributed over the whole perimeter thereof, the cells 7 in the screen 5 may be shaped so that the cross section thereof is hexagonal (FIG. 6).

Figure 7:
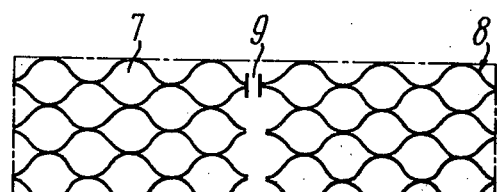
FIG. 7 is a plan view of a part of the screen comprising separate blocks, according to the invention.

To simplify the manufacture and assembly of the screens 5, it is preferable that they are constructed of separate blocks, each block comprising 50 to 150 cells (FIG. 7).

What is claimed is:

1. A device for heating air by flue gases in steam boilers and furnaces, comprising:
   a supply flue;
   heat-exchange tubes;
   tube plates in which are mounted said heat-exchange tubes;
   at least one section composed of said heat-exchange tubes and tube plates and installed in said supply flue;
   a device for protection of said tubes against abrasive wear incorporating at least one screen disposed in said flue upstream of said section;
   corrugated sheets facing each other and mating along the lines of contacts of convex portions thereof, whereby a plurality of cells are formed to make up said screen;
   wherein the height of each cell in said screen is two to five times the maximum size of the cross section thereof;
   and said cells having respective axes extending substantially parallel to longitudinal axes of said tubes.

2. A device according to claim 1, wherein said screen disposed inside said flue joins one of said tube plates, with the axis of each cell thereof aligned with the axis of one of the respective tube plates and with the distances between the cells equal to the distances between said heat-exchange tubes.

3. A device according to claim 2, comprising two screens, one of which is arranged inside a vertical portion of said supply flue.

4. A device according to claim 1, wherein each cell in said screen is hexagonal in cross section.

5. A device according to claim 1, wherein said screen is made of separate blocks, each of which comprises 50 to 150 cells.

* * * * *